US008271596B1

(12) United States Patent
Haskins et al.

(10) Patent No.: US 8,271,596 B1
(45) Date of Patent: *Sep. 18, 2012

(54) APPARATUS AND METHODS FOR CONTROLLING THE TRANSMISSION OF MESSAGES

(75) Inventors: Robert D. Haskins, Amherst, NH (US); Dale P. Nielsen, Amherst, MA (US)

(73) Assignee: Ziplink, Inc., Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,454

(22) Filed: Jan. 27, 2010

Related U.S. Application Data

(63) Continuation of application No. 09/715,641, filed on Nov. 17, 2000, now Pat. No. 7,672,998.

(60) Provisional application No. 60/204,472, filed on May 16, 2000.

(51) Int. Cl.
*G06F 15/16* (2006.01)
(52) U.S. Cl. ....................................................... 709/206
(58) Field of Classification Search ................... 709/206
See application file for complete search history.

(56) References Cited

U.S. PATENT DOCUMENTS

| | | | |
|---|---|---|---|
| 5,459,717 A | 10/1995 | Mullan et al. | |
| 5,555,191 A | 9/1996 | Hripcsak | |
| 5,822,526 A | 10/1998 | Waskiewicz | |
| 5,951,644 A | 9/1999 | Creemer | |
| 6,026,292 A | 2/2000 | Coppinger et al. | |
| 6,073,167 A | 6/2000 | Poulton et al. | |
| 6,324,569 B1 | 11/2001 | Ogilvie et al. | |
| 6,330,590 B1 | 12/2001 | Cotten | |
| 6,370,139 B2 | 4/2002 | Redmond | |
| 6,381,634 B1 | 4/2002 | Tello et al. | |
| 6,421,709 B1 | 7/2002 | McCormick et al. | |
| 6,438,584 B1 * | 8/2002 | Powers | 709/206 |
| 6,487,586 B2 | 11/2002 | Ogilvie et al. | |
| 6,507,866 B1 | 1/2003 | Barchi | |
| 6,546,416 B1 | 4/2003 | Kirsch | |
| 6,557,036 B1 | 4/2003 | Kavacheri et al. | |
| 6,604,132 B1 | 8/2003 | Hitt | |
| 6,609,156 B1 | 8/2003 | Magolan et al. | |

(Continued)

FOREIGN PATENT DOCUMENTS

WO 02/19069 A1 3/2002

OTHER PUBLICATIONS

Cranor, Lorrie Faith & LaMaccihia, Brian A., Spam!, Communication of the ACM, Aug. 1998, 74-83, vol. 41, No. 8.

(Continued)

*Primary Examiner* — Jerry Dennison
(74) *Attorney, Agent, or Firm* — Cantor Colburn LLP

(57) ABSTRACT

The invention provides systems, mechanisms and techniques for controlling transmission of outbound messages, such as e-mail or other types of messages, onto a computer network from an originator computer system. Connection equipment can authenticate and authorize the connection for the computer user and can capture and map originator network address information assigned to the originator computer system. A quota server can then determine if the message count exceeds the message limit for the originator identity associated with the outbound message Embodiments of the invention control message transmission from a sending or origination point prior to the messages being transmitted on the computer network, resources of a computer network are conserved and these embodiments prevent computer users from transmitting large amounts of outbound messages in excess of the message limits.

28 Claims, 7 Drawing Sheets

U.S. PATENT DOCUMENTS

| | | | |
|---|---|---|---|
| 6,609,196 B1 | 8/2003 | Dickinson, III et al. | |
| 6,643,686 B1 | 11/2003 | Hall | |
| 6,654,787 B1 | 11/2003 | Aronson et al. | |
| 6,668,045 B1 | 12/2003 | Mow | |
| 6,684,248 B1 | 1/2004 | Janacek et al. | |
| 6,735,701 B1* | 5/2004 | Jacobson | 726/1 |
| 7,032,023 B1 | 4/2006 | Barrett et al. | |
| 7,380,126 B2* | 5/2008 | Logan et al. | 713/176 |
| 7,689,563 B1* | 3/2010 | Jacobson | 707/663 |
| 7,788,329 B2* | 8/2010 | Barrett et al. | 709/206 |
| 2002/0032602 A1 | 3/2002 | Lanzillo, et al. | |
| 2002/0169954 A1 | 11/2002 | Bandini et al. | |
| 2002/0174010 A1 | 11/2002 | Rice, III | |
| 2003/0195968 A1 | 10/2003 | Selgas et al. | |
| 2003/0233420 A1* | 12/2003 | Stark et al. | 709/206 |
| 2004/0199592 A1 | 10/2004 | Gould et al. | |
| 2005/0010820 A1* | 1/2005 | Jacobson | 713/201 |
| 2005/0021649 A1* | 1/2005 | Goodman et al. | 709/207 |
| 2006/0031303 A1* | 2/2006 | Pang | 709/206 |
| 2007/0192422 A1* | 8/2007 | Stark et al. | 709/206 |

OTHER PUBLICATIONS

"Anti-Spam—Implementation Guideline", HKISPA Code of Practice, Version 1.0, 6 pages. (Feb. 2000) [http://hkispa.rg/hk/antispam/cop.html, retrieved Mar. 11, 2004].

"Upgrading from sendmail-8.8 to sendmail-8.9", University of Waterloo publication, 1 page. [http://ist.uwaterloo.ca/~dkeenan/docs/sendmail/to89.html, retrieved Mar. 11, 2004].

Form PTO892 from U.S. Office Action for U.S. Appl. No. 09/715,641 mailed Dec. 2, 2004.

Form PTO892 from U.S. Office Action for U.S. Appl. No. 09/715,641 mailed Nov. 25, 2008.

Form PTO892 from U.S. Notice of Allowance for U.S. Appl. No. 09/715,641 mailed Dec. 4, 2009.

Form PTO892 from U.S. Office Action for U.S. Appl. No. 09/715,641 mailed Mar. 29, 2004.

Form PTO892 from U.S. Office Action for U.S. Appl. No. 09/715,641 mailed Apr. 19, 2007.

Form PTO892 from U.S. Office Action for U.S. Appl. No. 09/715,641 mailed May 11, 2009.

Form PTO892 from U.S. Office Action for U.S. Appl. No. 09/715,641 mailed Sep. 11, 2007.

P. Fest, "Cookies cap Hotmail security hole", CNet News, [http://news.cnet.com/2100-1023-223249.html] pp. 1-3, (1999).

* cited by examiner

APPARATUS AND METHODS FOR CONTROLLING THE TRANSMISSION OF MESSAGES

RELATED APPLICATIONS

This is a continuation of application Ser. No. 09/715,641 filed Nov. 17, 2000, now U.S. Pat. No. 7,672,998 issued Mar. 2, 2010, entitled: "APPARATUS AND METHODS FOR CONTROLLING THE TRANSMISSION OF MESSAGES" and which claims the benefit of U.S. Provisional Application No. 60/204,472, entitled "E-MAIL SPAM CONTROL SYSTEM," filed on May 16, 2000 which is assigned to the same assignee as the present invention, which applications are hereby incorporated herein by reference in their entirety.

FIELD OF THE INVENTION

The present invention generally relates to systems and methods for handling messages transmitted from computer systems, and more particularly, to systems and techniques which provide an enforcement mechanism to control an amount of messages that may be transmitted from a computer system.

BACKGROUND OF THE INVENTION

The widespread popularity and consumer acceptance of computer networks such as the Internet has lead to a massive increase in the amount of information that such network transmit. In particular, the use of the Internet for commercial purposes has risen sharply over the past several years. Many types of mechanisms exists to support this exchange of information on computer networks. Examples of such information exchange mechanisms include the World Wide Web (i.e., web servers and browsers), Internet News (sometimes called USENET News), electronic mail (i.e., e-mail), instant message systems and other related software. Generally, the term "messaging system", as used herein, is meant to include all of the aforementioned information exchange mechanisms that operate within a computer network environment.

Though the particulars of the operation of different types of conventional messaging systems may vary (e.g., e-mail might operate somewhat differently than an instant messaging system), such conventional systems typically allow an originator to send messages that can reach multiple recipients. More specifically, conventional messaging systems generally provide the ability for a user on a source computer system coupled to a computer network to operate client software that creates and transmits (i.e., sends) messages onto the computer network for receipt by one or more users of remotely located destination computer systems which are also coupled to the computer network.

Using e-mail as a specific example, a user controlling an originator computer system can operate an e-mail client program such as Microsoft Outlook on their computer system to create an e-mail message containing content. The user can select and/or designate one or more recipients who are to receive the e-mail message containing the content. The user can then operate their originator computer system to logon to or connect with a network service provider. The network service provider may provide, for example, a dial-up account or may provide a dedicated connection between the originator computer system and a computer network such as the Internet. Once the originator computer system is coupled to (i.e., is involved in data communications with) the network service provider, the user can operate the e-mail client program to transmit the e-mail message as an outbound message from their originator computer system through the network service provider onto the computer network for receipt by those recipients designated by the user.

In a typical implementation, the e-mail client program transmits the outbound e-mail message to an e-mail server program that operates on a computer system associated with the network service provider. The e-mail server program receives the outbound e-mail message from the originator computer system and forwards a copy of the outbound e-mail message to each recipient computer user specified within the e-mail message. Once the network service provider computer system forwards the e-mail messages onto the computer network for each recipient, data communications equipment within the computer network propagates the e-mail messages through the network to their respective proper destination computer systems based on destination addressing information within each e-mail message. Typically, the initial destination computer system for an e-mail message is a computer system associated with the network service provider that provides the user account associated with the recipient of the e-mail message. This destination computer system operates another e-mail server program (referred to herein as the destination e-mail server program). The destination e-mail server program receives the incoming e-mail message and buffers or stores the e-mail message until the recipient user connects (e.g., via a dial-up connection) his or her recipient user computer system (e.g., a personal computer at this user's home) to the destination e-mail server computer system to retrieve (i.e., to download) any e-mail messages stored on behalf of that user. In this manner, e-mail can be exchanged between computer users in an efficient and reliable manner.

Conventional messaging systems, and e-mail software systems in particular, provide certain mechanisms that can limit the amount of messages that can be received by a recipient. For example, certain conventional e-mail client software programs such as Microsoft Outlook can be configured to reject or "bounce" e-mail received from certain computer users who send such e-mail messages. As a specific example, suppose an e-mail recipient receives an unsolicited or unwanted e-mail message from a certain originating computer user or from a certain network service provider domain (e.g., the domain associated with a network service provider for which a user does not wish to receive e-mail). In such a situation, to prevent the recipient from receiving similar messages in the future, the recipient computer user can configure his or her e-mail client software program with a list of designated computer user accounts or network service provider domains from which that user does not wish to receive e-mail. If one of the designated computer user accounts or network service provider domains in this list attempts to send another e-mail message to this user in the future, the recipients e-mail client software program will reject the message.

In this manner, recipients of e-mail can limit the amount of unwanted or unsolicited messages that they receive. It may be desirable to limit the receipt of unsolicited e-mail using such conventional techniques because large amounts of these messages can clutter the electronic mailbox (e.g., the inbox) that the e-mail client software program provides on the recipients computer system.

Generally, with respect to messaging systems, the term "computer user" as used herein refers to a user name or login account name assigned to a user (e.g., a person) of a computer system that can perform messaging on a computer network. The term computer user may also include a realm or domain name associated with the user name or login account name. By way of example, a network service provider called XYZ Corporation may have a registered domain name or realm of "XYZ.COM" on the Internet. A person named Joe may have a dial-up account (e.g., an Internet access account) with this network service provider (e.g., an Internet Service Provider or ISP) and thus may have a computer user name of "JOE@XYZ.COM." JOE@XYZ.COM may be a computer user who can both send and receive messages such as e-mail via his or her network service provider. In this case, JOE@XYZ.COM is also the e-mail address of this computer user name.

Returning again to the example of unsolicited e-mail messages, certain conventional media products can be purchased that contain large lists of computer user e-mail addresses. A specific example of such a media product might be a CD-ROM that contains hundreds of thousands of e-mail addresses of computer users on the Internet who can receive e-mail (i.e., active e-mail accounts). Suppose that the person operating the computer user account name JOE@XYZ.COM purchases such a CD-ROM product and uses the list of e-mail addresses encoded on the CD-ROM to send unsolicited e-mail advertisements (i.e., junk e-mail or spam) to each computer user recipient having an e-mail address encoded on the CD-ROM. There are certain conventional automated e-mailer programs that exist which can perform this task in a relatively effortless manner. This causes the network service provider (i.e., XYZ-.COM) that supports (i.e., provides) the computer user account JOE@XYZ.COM to be the source of all of these unsolicited e-mail messages or spam. Using conventional e-mail client software programs, a recipient computer user who desires to no longer receive such unsolicited bulk e-mails or "spam," either from JOE@XYZ.COM or from this particular network service provider, can configure his or her e-mail client software program (e.g., Microsoft Outlook) to reject future emails sent from either JOE@XYZ.COM or from the domain XYZ.COM.

SUMMARY OF THE INVENTION

Conventional mechanisms for limiting receipt of messages in a computer networking environment suffer from a variety of deficiencies. Most notably, all of the conventional techniques and mechanisms, for limiting for example, the amount of unsolicited e-mail received on a computer network involve configuring the recipient client software to detect an incoming unsolicited e-mail message. This software then can reject the message based upon an identity of the computer user or network service provider domain that originated the message. However, for this rejection to occur, the recipients e-mail software must have been pre-configured with the identity of the offending source computer user or network service provider identity which originated the message. That is, conventional techniques for limiting receipt of unsolicited e-mail are effective only when the recipient computer user becomes aware of the offending identity of the source of the e-mail message and thereafter configures his or her e-mail client software program to reject any future messages from this particular offending computer user or network service provider identity.

Junk e-mailers, also called "spammers" (i.e., computer users who produce the unsolicited or offending junk e-mails or spam) have become aware of the fact that recipient computer users can reject e-mail messages sent from known sources (e.g., identities of junk e-mail computer users or network service providers catering to such computer users). Accordingly, spammers have developed techniques that attempt to mask or hide the identity of the source computer user or e-mail account name used to send the unsolicited messages. One such technique involves slightly changing the computer user identity of each outbound e-mail message prior to transmitting that outbound message onto the computer network to a recipient. This may be done, for instance, by manipulating or spoofing certain aspects of the data communications protocol (e.g., the Simple Mail Transfer Protocol SMTP in the case of e-mail) used to transmit such messages such that the computer user identity which is associated with the source or "From:" field of the e-mail message contains a fraudulent source computer user identity. By performing this technique, it becomes difficult for recipient computer users of such unsolicited e-mail messages to consistently detect a known identity of the computer user or network service provider that originates the unsolicited e-mail. To this end, if the recipient computer user is unable to identify a consistently used computer user account or network service provider identity that originates the unsolicited e-mail messages, that recipient computer user will be unable to configure their e-mail client software program to reject unsolicited e-mail due to the fact that the identities change from one unsolicited e-mail message to the next.

Even if the identities of the source computer user and/or the source network service provider of unsolicited e-mail messages do not change from message to message, the process of configuring an e-mail client software program to reject such messages is somewhat cumbersome and may require skills that many recipient computer users do not have. In most cases, it is easier for a recipient computer user of junk e-mail to simply delete the junk e-mail messages once they are received on that recipient computer system instead of attempting to learn how to configure the e-mail client software program on a computer system to reject such messages in the future. In a sense then, a single offending computer user who generates large quantities of unsolicited e-mail messages may continue to do so unchecked, which collectively results in large amounts of wasted time spent by recipient computer users either having to configure their e-mail client software programs to reject such messages in the future or simply having to delete such messages upon receipt.

Though less pronounced than the aforementioned examples, other deficiencies with conventional techniques used to limit unsolicited messages in a computer network exist as well. Since such techniques are recipient based techniques (i.e., are performed at the message receiving computers), the computer network itself (i.e., the data communications equipment), each recipient network service provider (e.g., recipient e-mail server) and each recipient computer system (e.g., the recipients personal computer) are all burdened by the processing required to handle the unsolicited e-mail messages.

Conversely, the system of the invention is based in part on the observation of the aforementioned limitations of conventional message limiting techniques and serves to significantly overcome such limitations. To do so, the system of the invention provides a message quota transmission system which is enforced on the sending side of messaging systems. That is, the system of the invention enforces message quotas on computer users who originate outbound messages for transmission onto a computer network. An example of such a quota might be a limit of 100 messages that may be transmitted by a computer user onto a computer network with a 24-hour period. If the quota is exceeded and the originator computer user attempts to further transmit additional outbound messages onto a computer network in excess of the 100 in a 24-hour period message limit, then the system of the invention denies such message transmissions.

More specifically, the system of the invention provides methods and apparatus embodiments for controlling transmission of messages onto a computer network. In one such method embodiment, a method is provided for controlling transmission of messages from an originator computer system. The method comprises the steps of detecting an outbound message from an originator computer system and performing a quota enforcement operation based on a message count and a message limit to produce a message transmission result. The method also performs a selective transmit operation which may include at least one of i) transmitting the outbound message onto a computer network if the message transmission result contains a transmit value, or ii) preventing transmission of the outbound message onto a computer network if the message transmission result contains a no-transmit value. Using this technique, the system of the invention can perform the quota enforcement operation on each outbound message that a computer user attempts to transmit from an originator computer system onto a computer network. As will be explained, the computer user typically uses a computer user account which corresponds to an originator identity for that computer user to which the system of the invention can associate the message count and message limit.

In this manner, the invention can maintain a respective message count and message limit for each originator identity (i.e., each computer user account capable of transmitting outbound messages) and can use the message count and message limit to determine if a computer user attempting to transmit a message has exceeded his or her message quota as defined by the current message count and message limit values.

According to another embodiment of the invention, the step of performing the quota enforcement function includes the steps of comparing the message count associated with an originator identity of the outbound message with the message limit assigned to the originator identity of the outbound message to determine an occurrence of a message limit condition. If the message limit condition occurs, the method sets the message transmission result to a no-transmit value, and if the message limit condition does not occur, the method sets the message transmission result to a transmit value. The method then updates the message count associated with the originator identity of the outbound message. The invention thus traces or tracks the transmission of outbound messages for user accounts.

In another embodiment of the invention, the step of comparing the message count associated with an originator identity of the outbound message includes the steps of obtaining an originator address associated with the outbound message and obtaining the originator identity associated with the outbound message by performing an originator identity lookup based on the originator address. The method also obtains at least one message count associated with the originator identity by performing a message count lookup based on the originator identity. Using this technique, the computer user may connect to a messaging system any number of times using a particular user account having an associated originator identity. During the authentication process for that user account, the invention maps the network address assigned to an originator computer system under control of the computer user at that time back to the originator identity associated with that user account for that computer user. The invention can then use the originator identity obtained via this mapping to obtain one or more message counts associated with the originator identity to perform the message quota enforcement operation of the invention.

In another embodiment of the invention, the step of obtaining an originator address includes retrieving a network address associated with the outbound message from a message connection establishment protocol used to transfer the outbound message from an originator computer system to a recipient computer system. By way of example, when a message connection establishment protocol such as the Simple Mail Transfer Protocol (SMTP) detects an outbound message, the invention can obtain the network address of the packet or packets used to transmit that message. Also in this method embodiment, the step of obtaining the originator identity includes the step of querying a login database containing mappings of originator addresses to originator identities based on the originator address obtained in the step of obtaining an originator address.

As will be explained further, the system of the invention provides a login extractor process which operates during the authentication process of a connection between remote access server equipment and an originator computer system. The login extractor process maintains the login database to keep mappings of originator addresses (i.e., network addresses) to currently assigned or active connections for respective originator identities (e.g., account names). Accordingly, the login extractor process will always properly maintain the current network address in use by a particular originator identity during the lifetime of a connection under control of the originator identity. Subsequently, when outbound messages are detected by the system of the invention, the network address of those outbound messages can be used by the system of the invention to determine the correct originator identity (e.g., the actual account name) that is in use when a user attempts to transmit the outbound message.

Also in this embodiment, the step of obtaining a message count for the originator identity associated with the outbound message includes querying a quota database containing associations of message counts to originator identities based on the originator identity associated with the outbound message. The message count is at least one message count that indicates, for an originator identity, a current number of outbound message transmitted over an elapsed time interval. The message limit is at least one message limit corresponding to a respective message count that indicates, for an originator identity, a maximum number of outbound messages that may be transmitted over a predetermined time interval. Preferably, there are multiple message counts each having corresponding message limits, such that a multi-stage quote enforcement system is provided by the invention. For example, one message limit might set a quota of no more than one hundred messages per day, while another message limit might set a secondary quota at no more than ten messages in a two minute period.

In yet another embodiment, the step of updating the message count associated with the originator identity of the outbound message includes the steps of calculating a total number of recipients for the outbound message and incrementing the message count associated with the originator identity by the total number of recipients for the outbound message. Using this technique, the system of the invention increments the message count for a particular originator identity based on the total number of recipients to which an outbound message is transmitted. Recipients may include carbon copy (e.g., CC:) or blind carbon copy (e.g., BCC:) recipients of an e-mail message, for example.

In another embodiment, the message limit indicates an amount of outbound messages that may be transmitted from the originator computer system over a certain period of time for the originator identity associated with the outbound message and the originator identity of the outbound message is indicative of at least one of i) a specific user account operating under control of a computer user; ii) a specific message sending user; and/or iii) a specific domain.

In a further embodiment, the message limit condition indicates if a computer user account associated with the originator identity used to transmit the outbound message is attempting to transmit a number of outbound messages that exceeds the message limit in a predetermined amount of time. Also in this embodiment, the message limit condition occurs if the step of comparing determines if the message count exceeds the message limit or if the message count is equal to the message limit.

In still another embodiment, the quota enforcement operation includes the steps of verifying an authenticity of an originator address associated with the outbound message and verifying authenticity of at least one recipient associated with outbound message. Using this technique, this embodiment of the invention can verify the authenticity of the originator address of the outbound message to ensure that the outbound message has arrived from an originator computer system and/or username from which it purports to have arrived. This avoids a situation that allows a computer user to specify a fraudulent username as the originator of an email message (i.e., avoids false names in the FROM: field of an email message).

In another embodiment, the step of performing a quota enforcement operation includes the step of comparing a previous message transmission result with a no-transmit value, and if the previous message transmission decision equals the no-transmit value, performing the step of performing a selective transmit operation.

In still another embodiment, the step of detecting an outbound message includes the steps of searching a quota enforcement list for an originator address associated with the message, and if the originator address associated with the message is contained in the quota enforcement list, performing the steps of performing a quota enforcement operation and performing a selective transmit operation, and if the originator address associated with the message is not contained in the quota enforcement list, skipping the step of performing the quota enforcement operation and performing the step of transmitting the outbound message from the computer system.

A further embodiment includes the steps of authenticating a connection from the originator computer system and recording authentication information in a login database. The authentication information can include an originator address assigned to the originator computer system and an originator identity associated with the originator address. The method also receives, for transmission to a recipient computer system, the outbound message from the originator computer system and forwards the outbound message to a quota server to perform the steps of detecting an outbound message, performing a quota enforcement operation and performing a selective transmit operation. In this manner, the system of the invention can authenticate a connection under control of the computer user operating an originator computer system who provides an accurate and truthful originator identity (e.g., and account name having a username and password). Once authenticated, the invention can record authentication information including a mapping of the originator identity to the current originator network address assigned to the originator computer system under control of that computer user. In this manner, this information can later be used to perform message quota enforcement as explained herein on any outbound messages that that computer user attempts to transmit from the originator computer system.

Another embodiment of the invention is directed to a method for controlling transmission of messages onto a computer network. This embodiment includes the steps of detecting an outbound electronic mail message to be transmitted onto the computer network from an originator computer system. In response to the step of detecting, the method compares i) at least one message count associated with an originator identity associated with the outbound message to ii) at least one message limit assigned to the originator identity associated with the outbound message that corresponds respectively to the at least one message count. These comparisons are done to determine a message transmission result that indicates if the originator computer system operating under the originator identity is attempting to transmit an outbound electronic mail message to a number of recipients that exceeds the message limit. If the message transmission result is a no-transmit value, the method prevents further transmission of outbound electronic mail messages onto the computer network for the originator identity, and if the message transmission result is a transmit value, the method allows transmission of the outbound electronic mail message onto the computer network on behalf of the originator identity.

Other embodiments of the invention relate to computer systems configured in various manners, and in particular, to computer systems which are configured to perform all of the methods and techniques disclosed herein as the invention. Generally, such embodiments are directed to a computer system that includes a processor, a memory system, a network interface and an interconnection mechanism coupling the processor, the memory system and the network interface. In these embodiments, the memory system is encoded with a quota database and a quota server and the quota server performs on the processor in the computer system. When the processor performs the quota system, the processor causes the computer system to control transmission of messages from an originator computer system onto a computer network by performing any of the aforementioned method embodiments of the invention. That is, embodiments of the invention are directed to a computer system configured in any manner to perform the techniques explained herein as the system of the invention.

While preferred embodiments of the invention are implemented as one or more software processes, programs, routines, libraries or other entities that perform (e.g., are executed, interpreted or otherwise operated) within computer systems or computerized devices, the invention should not be construed as being limited to software and may be performed by circuitry or specialized processors within one or more computer systems. Also, it is to be understood that the system of the invention can be distributed as will be explained in detail below.

Generally, in distributed embodiments of the invention, techniques of the invention which capture login information during the computer user authentication process (i.e., the login extractor) are performed in a first computer system environment (e.g., in connection equipment) which is typically associated with a first network service provider. This first computer system environment might include, for instance, connection equipment handling the authentication and remote access of the user connection and capturing (e.g., a login extractor of the invention) of the mapping between originator identities and originator addresses within a login database. The second computer system environment can include a quota server configured as explained herein to perform message quota enforcement. The information in a login database which is captured via the first computer system environment can be used during message quota enforcement as will be explained.

Other embodiments of the invention that are disclosed herein include software programs to perform the method operations summarized above and disclosed in detail below. In particular, such embodiments include a computer program product having a computer-readable medium including computer program logic encoded thereon that when performed on a computer system, causes the host computer system to control the transmission of outbound messages onto a computer network. In such embodiments, when the computer program logic is performed on a processor in the computer system, the computer program logic causes the processor to perform any or all of the method operations disclosed herein as the invention. These embodiments of the invention are typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a host computer system to cause the host computer system to perform the techniques explained herein as the invention.

It is to be understood that the system of the invention can be embodied strictly as a software program, as software and hardware, or as hardware alone and may be distributed or centralized as explained herein. An example operational embodiment of the invention is mail message metering software manufactured by Ziplink Corporation of Lowell, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques and mechanisms that allow a computer system to control an amount of messages transmitted onto a computer network by an originator of the messages. By way of example, one embodiment of the system of the invention provides an e-mail quota enforcement system which prevents a sender of e-mail messages (e.g., a computer user) from sending a predetermined number of e-mail messages in a specific time interval that exceeds a quota assigned to the user for that interval. In this manner, a computer user is prevented from sending an unlimited number of e-mail messages onto a computer network such as the Internet. In other words, the system of the invention can be used to regulate "spam" sent by "spammers", which as explained above are the common terms for computer users (i.e., spammers) who send large volumes of e-mail messages (i.e. spam) to hundreds or thousands of individual recipients, many of whom often do not request such e-mail messages.

Figure 1:
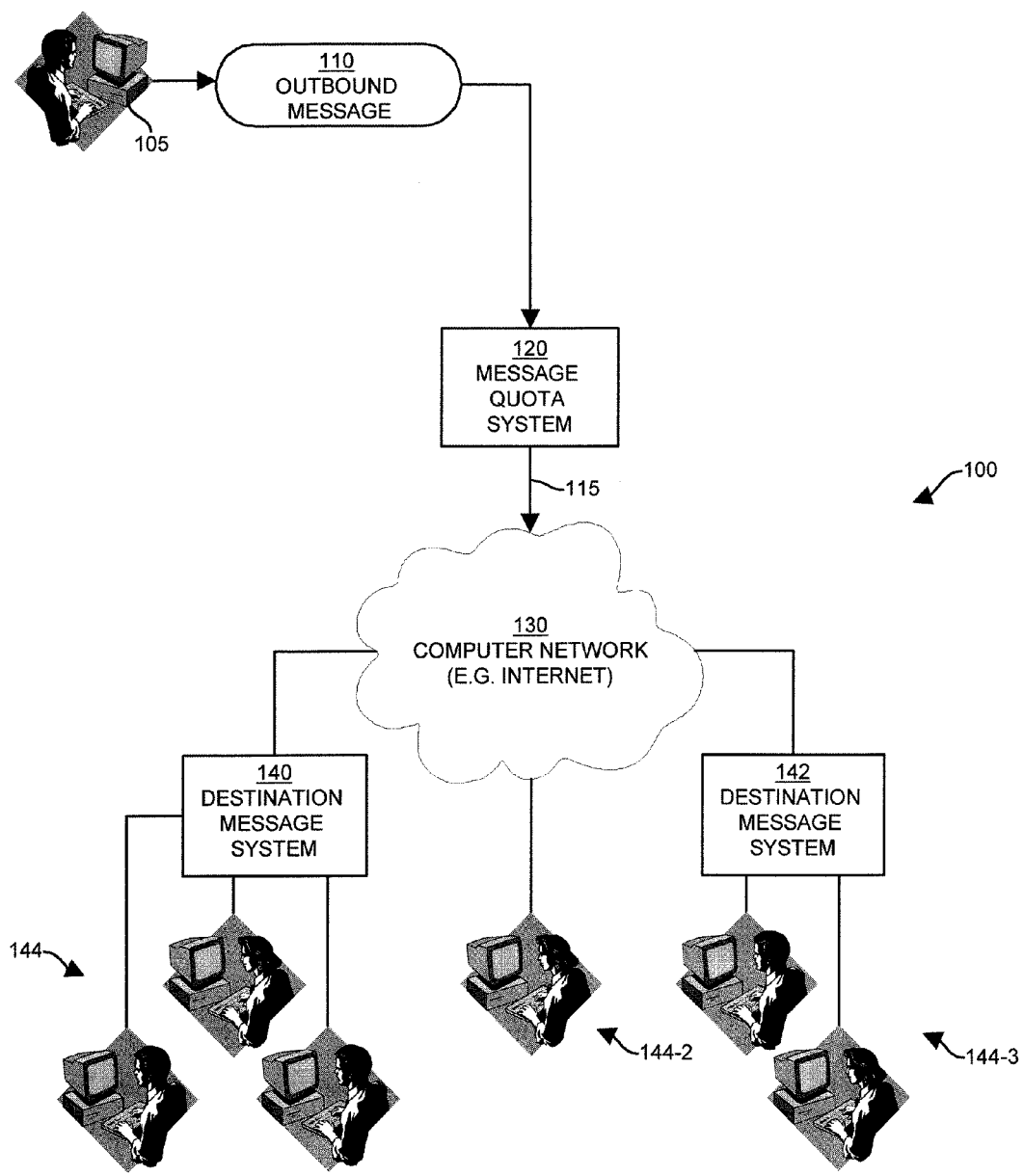
FIG. 1 illustrates a computing system environment including a message quota system configured according to one embodiment of the invention.

FIG. 1 illustrates a computer system environment 100 configured in accordance with the invention. The computer system environment 100 includes a computer network 130 such as the Internet which interconnects an originator computer system 105 and a plurality of recipient computer systems 144-1 through 144-3. Certain groups of recipient computer systems such as 144-1 and 144-3 couple to the computer network 130 via respective destination message systems 140 and 142, while other recipient computer systems such as 144-2 may directly couple to the computer network 130. The destination message systems 140 and 142 may be, for example, recipient e-mail server systems associated with network service providers that provide computer user accounts for the computer users of the recipient computer systems 144.

Disposed between the originator computer system 105 and the computer network 130 is a message quota system 120 configured according to embodiments of the invention to limit the number of outbound messages 110 that the originator computer system 105 can transmit onto the computer network 130 for receipt by the recipient computer systems 144. In a preferred embodiment of the invention, the outbound messages 110 are e-mail messages that the originator computer system 105 formats (e.g., addresses to recipients) and transfers according to an e-mail transfer protocol such as the Simple Mail Transfer Protocol (SMTP) onto the computer network 130.

Figure 2:
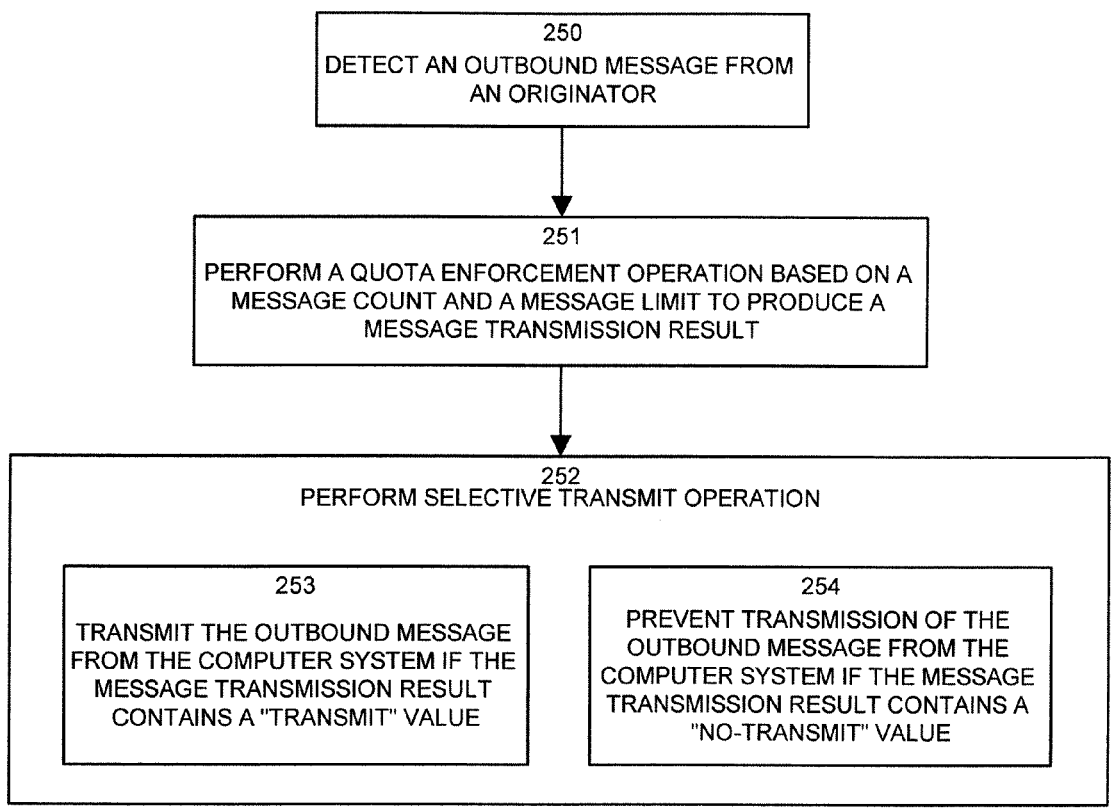
FIG. 2 is a flow chart of processing steps performed by the message quota system shown in FIG. 1.

FIG. 2 illustrates the general processing steps 250 through 254 that the message quota system 120 performs according to embodiments of the invention to limit the transmission of outbound messages 110 onto the computer network 130. The high-level operation of the message quota system 120 shown in FIG. 1 will be explained with respect to the processing steps in FIG. 2.

In operation of the system of the invention, the originator computer system 105 transmits one or more outbound messages 110 for receipt by certain of the recipient computer systems 144 via transmission through the computer network 130. In step 250, the message quota system 120 detects the outbound message 110 (e.g., via receiving such a message) from the originator, which in this case is the computer user controlling the originator computer system 105.

In step 251, the message quota system 120 performs a quota enforcement operation (e.g., via software control, not specifically shown) based on a message count and a message limit, both of which are associated with the computer user controlling the originating computer system 105, to produce a message transmission result. That is, the message quota system 120 maintains a message count associated with the originator identity (e.g., a computer user account name) of the originator who transmitted the outbound message 110 that indicates how many messages have been sent using the originator identity over a certain prior period of time. The message quota system 120 also maintains at least one message limit associated with the originator identity that indicates a maximum number of messages that are allowed to be transmitted onto the computer network 130 for that particular originator identity over a specific interval of time. Generally, the message count(s) corresponds to the message limit(s) in that respective message counts are compared to respective message limits, as will be explained. Based on the message count and the message limit associated with the originator identity obtained foreign outbound message 110, the quota enforcement operation can determine the message transmission result that indicates whether or not the outbound message 110 should be transmitted onto the computer network 130.

Next, in step 252, the message quota system 120 performs a selective transmit operation that transmits (e.g., propagates onto the computer network 130) the outbound message 110 from the originator computer system 105 onto the computer network 130 if the message transmission result, as determined by the quota enforcement operation, contains a "transmit" value (sub-step 253). Alternatively, the message quota system 120 prevents transmission of the outbound message 110 from the originator computer system 105 onto the computer network 130 if the message transmission result produced as a result of the quota enforcement operation (step 251) contains a "no-transmit" value (sub-step 254).

In this manner, the system of the invention prevents, for example, a user of the originator computer system 105 from transmitting an unlimited number of outbound messages 110 onto the computer network 130 destined for an unlimited number of recipients 144. In the case of e-mail messages, the system of the invention thus prevents a person from "spamming" recipients with bulk or unwanted e-mail messages. In doing so, the computer network such as the Internet is not subject to abusive spam email messages from computer user who have accounts (i.e., subscribe to network service) with a network service provider that uses the system of the invention. Accordingly, since message use is limit to required use (as imposed by a proper setting of the message limits for a particular originator identity), and not spam or junk message use, the domain associated with the network service provider is somewhat protected from being labeled as a "source of spam" on the computer network. In other words, conventional network service providers can become known sources of spam over time and thus computer users on the Internet might tend to configure their browsers to reject messages from domains associated with those network service providers. However, using the invention, a network service provider can protect itself from becoming labeled in this manner since the invention limits the amount of message a user can send from his or her network service provider. As such, chances are greater that a particular user will use his or her message limit to send legitimate messages instead of junk or spam related messages.

Since the system of the invention enforces a message quota within the sending transmission path that an outbound message 110 must initially traverse from an originator computer system 105, onto the computer network 130, to a destination recipient 144, the system of the invention limits outbound message traffic from the originator computer system 105 to a number of outbound messages 110 allowed by the quota for the particular computer user who transmits such outbound messages 110.

Furthermore, since the system of the invention performs outbound message quota enforcement prior to the outbound messages 110 leaving the domain or realm of a network service provider (not specifically shown in FIG. 1) that provides a computer user account for the computer user controlling the originator computer system 105, unsolicited or unwanted outbound messages 110 (e.g., spam) are curtailed prior to reaching a computer network 130 thus saving computer network resources. As noted above, the domain or realm of the network service provider that uses the message quota system 120 of the invention will not be perceived by users of recipient computer systems 144 as being a producer of such unsolicited or unwanted outbound messages 110. The invention also results in recipient computer users not having to manually configure e-mail client software programs to reject unsolicited e-mail. Nor are such users required to delete such unsolicited e-mail because the system of the invention prevents the originator computer system 105 from transmitting unsolicited e-mail in the first place.

Figure 3:
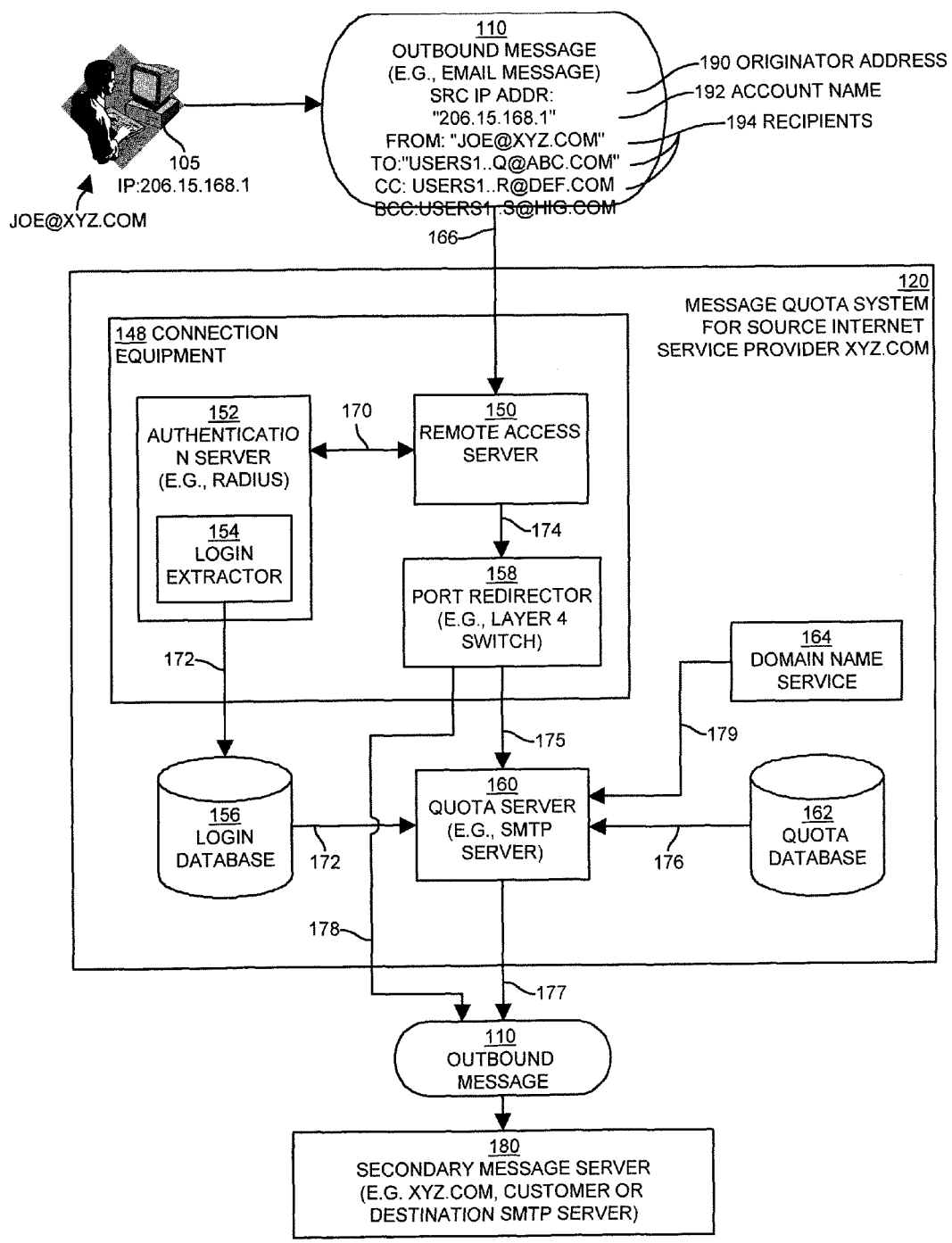
FIG. 3 illustrates a more detailed architecture of a message quota system configured according to one embodiment of the invention and also illustrates details of an outbound message.

FIG. 3 illustrates a more detailed architecture of the message quota system 120 configured according to one embodiment of the invention and also illustrates a bit more detail concerning the content of an outbound message 110, which is an e-mail message in this example. The message quota system 120 generally includes connection equipment 148 which couples to a quota server 160. The quota server 160 in this example embodiment is a Simple Mail Transfer Protocol (SMTP) server modified according to embodiments of the invention. The message quota system 120 also includes a login database 156, a quota database 162, and optionally a domain name service 164. The connection equipment 148 comprises a remote access server 150 coupled to a port redirector 158 and an authentication server 152, which includes a login extractor process 154. The operation of these components will be explained with respect to FIG. 4.

Figure 4:
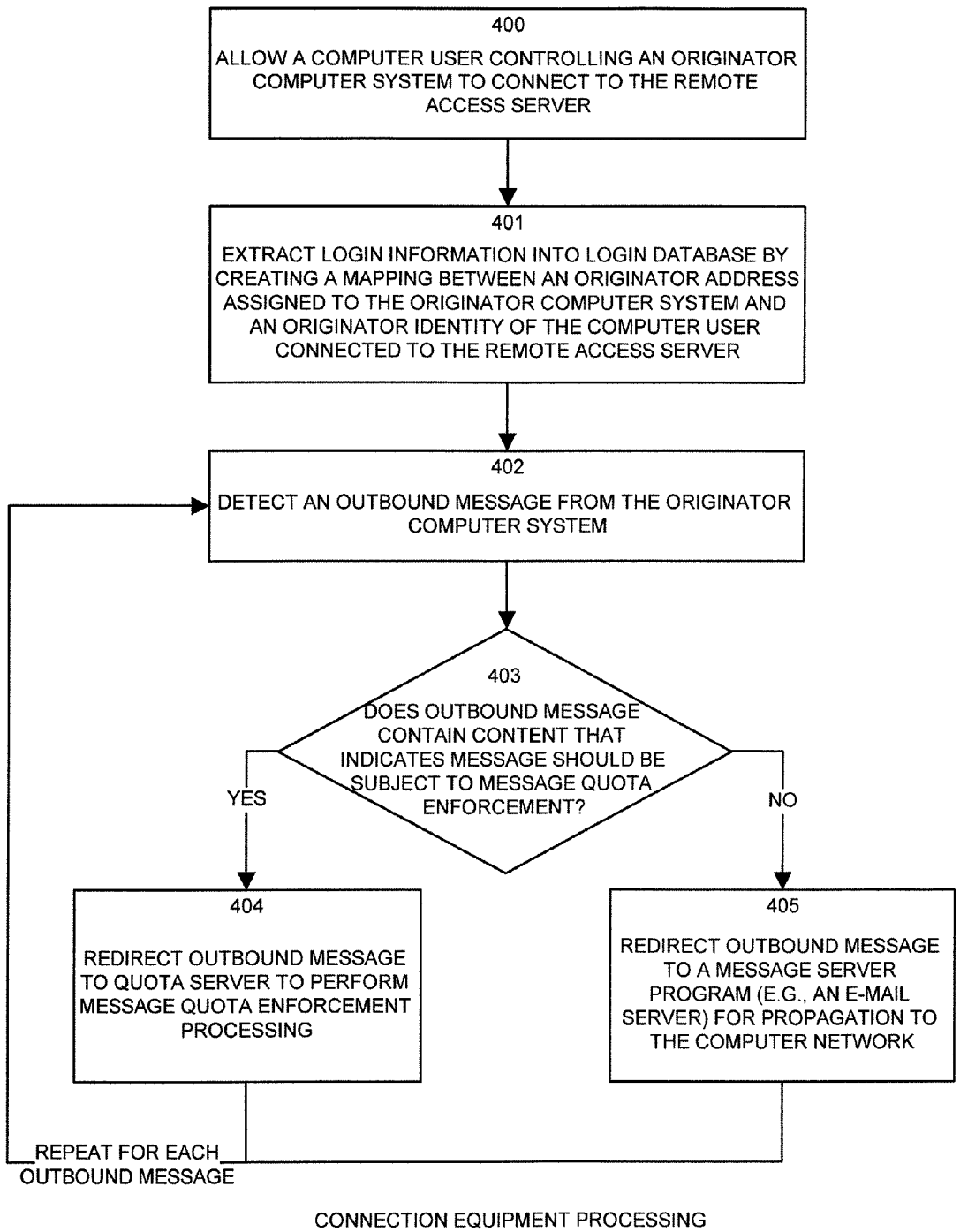
FIG. 4 is a flow chart of processing steps performed by the connection equipment components within the message quota system illustrated in FIG. 3.

FIG. 4 provides a flow chart of processing steps that the connection equipment components within the message quota system 120 perform according to embodiments of the invention. Generally, the connection equipment 148 receives and authenticates connections 166 on behalf of computer user accounts operated by computer users controlling the originator computer system(s) 105 (only one shown in this example). Once a computer user has established a connection 166 with the connection equipment 148, during the remainder of the duration of the connection 166 (i.e., during the duration of the data communications session 166 between the originator computer system 105 and the message quota system 130) the connection equipment 148 is responsible for directing outbound messages 110 that are to be subject to the quota enforcement system of the invention to the quota server 160 for processing as explained below.

More specifically, with respect to the flow chart in FIG. 4, in step 400, the remote access server 150 operates in conjunction with the authentication server 152 to allow a computer user controlling the originator computer system 105 to connect 166 to the remote access server 150. The remote access server 150 may be, for example, dial-in network access server equipment such as a modem bank that allows computer users of computer systems such as the originator computer system 105 to dial-in to computer user accounts provided by a network service provider for access to the computer network 130.

The authentication server 152 in this example embodiment is a RADIUS (Remote Authentication Dial-in User Services) server which executes or otherwise performs RADIUS authentication and accounting software functions according to techniques defined by Request For Comments 2138 and 2139 (RFC2138 and RFC 2139), the contents and teachings of which are hereby incorporated by reference in their entirety. Generally, when a user of the originator computer system 105 dials-in or otherwise connects to the remote access server 150, the remote access server 150 interacts 170 with the authentication server 152 (e.g., via RADIUS authentication and authorization techniques) to authenticate and authorize access to a computer user account provided by the remote access server 150 for the computer user operating the originator computer system 105.

In the example in FIG. 3, the authentication server 152 authenticates the computer user designated by the account name JOE@XYZ.COM. Thus, user JOE@XYZ.COM logs in to the remote access server 150 (step 400, FIG. 4) and the remote access server 150 dynamically assigns the network IP address 206.15.168.1 to the originator computer system 105. During establishment of the connection 166, the remote access server 150 may assign the network address (IP address 206.15.168.1 in this example) via a dynamic address assignment mechanism such as the Dynamic Host Configuration Protocol (DHCP) that operates between the remote access server 150 and the originator computer system 105 during the login and authentication process of step 400.

Next, in step 401, the login extractor 154 configured according to embodiments of the invention extracts login information (not specifically shown) from the authentication server 152 into the login database 156 by creating a mapping of the originator address (e.g., the network IP address) which the remote access server 150 assigned to the originator computer system 105 during connection setup (step 400) to an originator identity (i.e., the user account JOE@XYX.COM) of the computer user operating the data communications session 166. In a preferred embodiment, the login extractor 154 is a computer program that operates on the authentication server 152 to continuously monitor login information (e.g., RADIUS accounting data, not specifically shown) that the authentication server 152 (i.e., RADUIS software) produces in response to each instance of a computer user operating the originator computer system 105 to connect 166 to the remote access server 150 (i.e., in step 400) via a user account.

Figure 5:
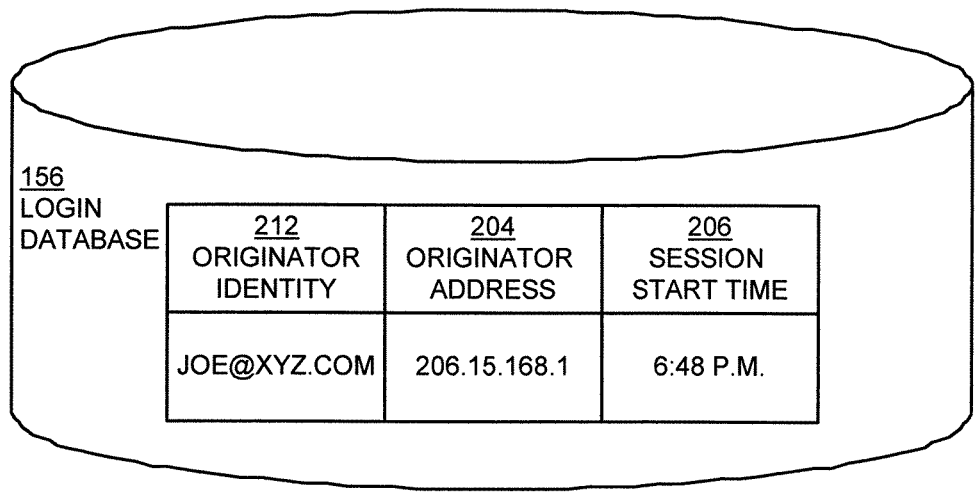
FIG. 5 is an example of the content of a login database configured according to one embodiment of the invention.

FIG. 5 illustrates an example of the content which the login extractor 154 writes to the login database 156 in step 401. In this embodiment, each entry (e.g., a row, only one shown in this example) in the login database 156 includes an originator identity 212 (e.g., a user account name) mapped to a respective originator address 204 along with a corresponding session start time 206. Essentially, the login extractor 154 maintains a mapping between currently active user account names and respective network addresses in use by those user account names. The session start time 206 indicates the time at which the user account associated with the originator identity 212 established the connection 166 with the remote access server 150. With respect to the specific illustrated example in FIG. 3 and the example entry in the login database 156 in FIG. 5, the login database entry indicates that the originator identity JOE@XYZ.COM is currently using an originator network address of 206.15.168.1 and commenced the connection 166 at 6:48 PM. Once the login extractor 154 has performed step 401, the system of the invention is relatively passive until the computer user (e.g., JOE@XYZ.COM) attempts to send an outbound message 110. If the user logs out or disconnects, thus breaking the connection 166, the login extractor 154 can also detect this condition and then removes the entry (i.e., the row) in the login database 156 that mapped that user's originator identity to that originator address 204.

Returning attention now to the processing steps in FIG. 4 and the example embodiment in FIG. 3, assume for this example that the computer user operating under the account name JOE@XYZ.COM attempts to send the example outbound e-mail message 110 shown in FIG. 3 from the originator computer system 105 to the computer network 130 (FIG. 1).

The port redirector 158 detects this action in step 402. For example, in step 402, the port redirector 158 can detect the outbound message 110 from the originator (e.g., computer user JOE@XYZ.COM) upon its transmission for the originator computer system 105 via connection 166 to the remote access server 150. In a preferred embodiment of the invention, the port redirector 158 is a "Layer 4" data communications switch which is capable of detecting content of such as protocol information or other packet information within the outbound message 110 and is capable of switching the outbound message 110 to alternate destinations based upon such content.

Next, in step 403, the port redirector 158 determines if the outbound message 110 contains content that indicates that the outbound message 110 should be subject to the message quota enforcement system of the present invention. If the port redirector 158, in step 403, determines that the outbound message 110 is to be subject to the message quota enforcement techniques of the invention (as will be explained), the port redirector 158 redirects the outbound message 110 on data communications path 175 to the quota server 160 to perform the message quota enforcement processing. The message quota enforcement processing is shown by processing steps in FIG. 7, which will be explained shortly. However, if in step 403, the port redirector 158 determines that the outbound message 110 is not subject to the message quota enforcement techniques of the invention (discussed below), the port redirector 158 redirects the outbound message 110 on data communications path 178 to a message server program 180, such as an e-mail server program in this example, for propagation onto the computer network 130 to one or more recipients to the outbound message 110.

In one embodiment of the invention, all outbound messages 110 are subject to message quota enforcement according to the techniques explained herein. By way of example, the port redirector 158 can redirect all outbound messages 110 (e.g., packets of data containing e-mail messages) that are directed to the Transmission Control Protocol (TCP) port twenty five (25), which is the TCP protocol port used to transmit e-mail messages on a data communications network.

Alternatively, depending upon the configuration of the invention, it may be the case, for example, that only certain computer user accounts (i.e., originator identities) or certain designated originator addresses, domain names, realms, etc., from which outbound messages 110 originate, are to be subject to the quota enforcement techniques of the invention. Accordingly, step 403 provides the ability for the port redirector 158 to determine whether or not each outbound message 110 is to be processed according to the quota enforcement techniques of the invention or not based on content contained within that outbound message 110. That is why in this example the port redirector 158 is a Layer 4 switch which is capable of analyzing protocol and/or data content contained within an outbound message 110.

As shown in FIG. 4, the port redirector generally repeats processing steps 402, 403 and 404 or 405 for each outbound message 110 that the port redirector 158 detects during the duration of the data communications session 166. That is, once the computer user JOE@XYZ.COM has established the connection 166 with the remote access server 150 via steps 400 and 401, during the duration of this connection 166, the port redirector 158 will detect (Step 402) and forward or redirect (step 403 and 404) all outbound messages 110 which are subject to message quota enforcement to the quota server 160 and will forward (step 403 and 405) all other outbound messages 110 (i.e., those not subject to message quota enforcement) to a message server 180 for further processing on the computer network 130. That is, once the connection equipment 148 has completed the process of establishing the connection 166 and begins receiving outbound messages 110 from the originator computer system 105, as explained above, the port redirector 158 redirects such outbound messages 110 to the quota server 160 for quota enforcement processing.

Prior to explaining the details of the operation of the quota server 160, attention is directed now to the example outbound message 110 illustrated in FIG. 3. In this example, the outbound message 110 is an e-mail message containing various content fields 190 through 194. In particular, the outbound e-mail message 110 includes a source or originator address field 190 which contains the originator network address 206.15.168.1. This is a network address that the remote access server 150 assigns to the originator computer system 105 during the establishment of connection 166. Note that this network address field 190 may change in value each time the computer user controlling the originator computer system 105 re-establishes a new connection 166 with a remote access server 150. However, for any number of outbound messages 110 transmitted from the originator computer system 105 using a particular connection 166, the value of the originator address field 190 remains the same and is equivalent to the network address assigned to that connection 166 for the originator computer system 105.

The outbound message 110 also includes an account name field 190 which in this example is the "FROM:" field of the e-mail message that contains the account name JOE@XYZ.COM. As mentioned above, sophisticated computer users can manipulate email software client programs (not specifically shown) on the originator computer system 105 to produce a fraudulent value for the account name field 192 within an outbound e-mail message 110. Accordingly, in the case of spam or unsolicited outbound e-mail messages 110, it is often the case that the value in the account name field 192 is different from the actual originator identity 212 provided during the establishment of the connection 166. Stated differently, the login extractor 154, as explained above, obtains the true originator identity 212 (FIG. 5) and currently assigned originator network address 204 (FIG. 5) of the computer user operating the originator computer system 105 during the authentication process (steps 400, 401 in FIG. 4) required to establish the connection 166. However, once this computer user has established the connection 166, any outbound messages 110 sent by that computer user may contain a fraudulent account name field 192 that does not match the originator identity 212 stored within the login database 156.

The outbound e-mail message 110 also contains a plurality of recipient fields 192 respectively labeled "TO:" "CC:" and "BCC:" that in this example each contain a list of recipient e-mail addresses (e.g., USERS 1..Q@ABC.COM, USER1..R@DEF.COM, and USERS1..S@HIG.COM) corresponding to various recipient computer users 144 (FIG. 1) on the computer network 130. One objective of the present invention is to limit the amount of recipients 192 that can receive a particular outbound message 110.

As explained above in the background of the invention, a problem exists in conventional e-mail systems in that a computer user controlling an originator computer system 105 can essentially designate an unlimited number of recipients 192 for an outbound message 110 which causes significant processing burdens on hardware and software within the computer network 130. Furthermore, also as explained above, a computer user can attempt to fraudulently identify the account name value in the account name field 192 of an e-mail address 110 such that recipient computer users 192 will be unable to easily detect the true originator identity 212 of the sender of the outbound message 110. The quota enforcement system of the invention is able to curtail such abuses of e-mail transmissions by limiting the number of recipients 192 of outbound messages to a particular amount over a certain time interval for a particular user account associated with the true originator identity 212 of the computer user sending outbound messages 110. In other words, if a computer user generates an outbound message 110 with a large amount of recipients 192 (or generates many outbound message with a large or small number or recipients 192 in each message 110) and possibly attempts to fraudulently modify the account name field 192, the system of the invention is still able to enforce message quotas is based on the true originator identity 212 that the computer user must provide during the establishment of the connection 166.

Figure 7:
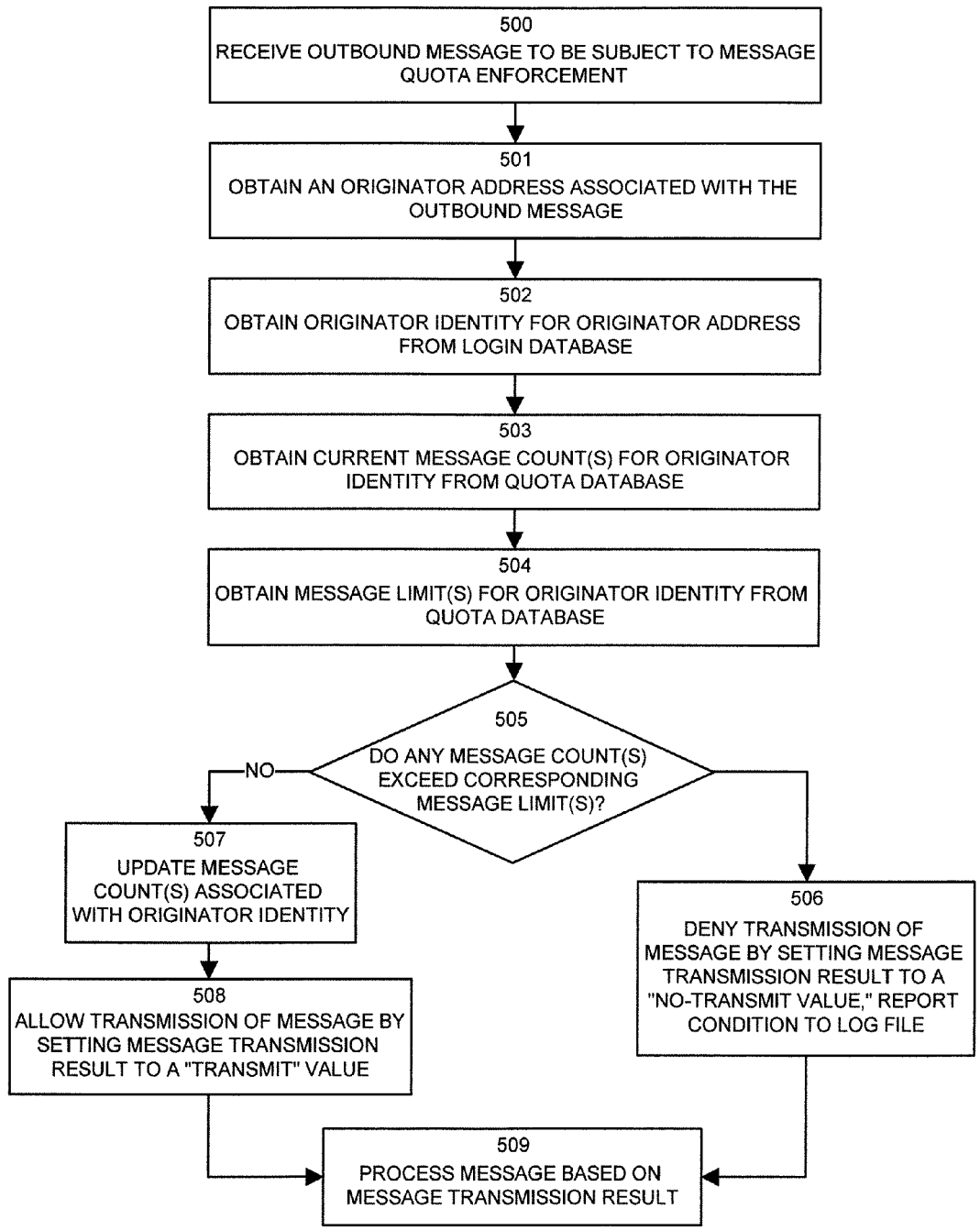
FIG. 7 is a flow chart of processing steps performed by a quota server configured according to one embodiment of the invention.

FIG. 7 shows an example of message quota enforcement processing steps in accordance with one embodiment of the invention. Generally, a processor (not specifically shown) within the quota server 160 performs the message quota processing steps shown in FIG. 7 to determine whether or not an outbound message 110 should be transmitted to its intended recipient(s) 192 on the computer network 130.

In step 500, the quota server 160 receives an outbound message 110 that is to be subject to the message quota enforcement processing explained herein. As explained above, outbound messages 110 that the quota server 160 receives are generally forwarded to the quota server 160 via the port redirector 158. In a preferred embodiment of the invention, the quota server 160 is a modified version of a mail server program such as the Simple Mail Transfer Protocol Demon (SMTPD) server program. The modifications to the SMTPD program include adding the quota enforcement functionality explained herein.

Next, in step 501 the quota server 160 obtains the originator address 190 within the outbound message 110. As indicated above, this originator address 190 remains constant for the duration of the connection 166 with the remote access server 150.

Next, in step 502, the quota server 160 obtains the originator identity 212 associated with the originator address 190 from the login database 156. As an example, the quota server 160 can query the login database 156 based on the originator address 190 to obtain the originator identity 212 that indicates which computer user the originator computer system 105 is using to transmit the outbound message 110. Recall from the processing of the connection equipment 148 as explained above, the login extractor 154 produces a mapping in the login database 156 between the true originator identity 212 of the account name used to establish the connection 166 and the originator network address 204 that is currently assigned to the connection 166. Accordingly, the originator identity 212 obtained in step 502 from the login database 156 is the true originator identity 212 associated with the account name that is being used in an attempt to transmit the outbound message 110 from the originator computer system 105.

Now that the processing of the invention has determined the true originator identity 212 (i.e., has determined which Internet network service provider user access account) that the originator computer system 105 is using to attempt to transmit the outbound message 110, the system of the invention can determine one or more current message counts associated with that originator identity. Generally, as used herein, the term "message count" refers to a current number of messages that have been sent during a predetermined time interval, where each recipient of an outbound message 110 counts as one message count.

Accordingly, in step 503, the quota server 160 obtains (e.g., via a query), from the quota database 162, the current set of one or more message counts 214 for the originator identity 212 determined in step 502. The current set of one or more message counts 214 for the originator identity 212 indicate how many messages (one per recipient) have been sent using the account name of the originator identity 212 over an elapsed predetermined amount of time.

Figure 6:
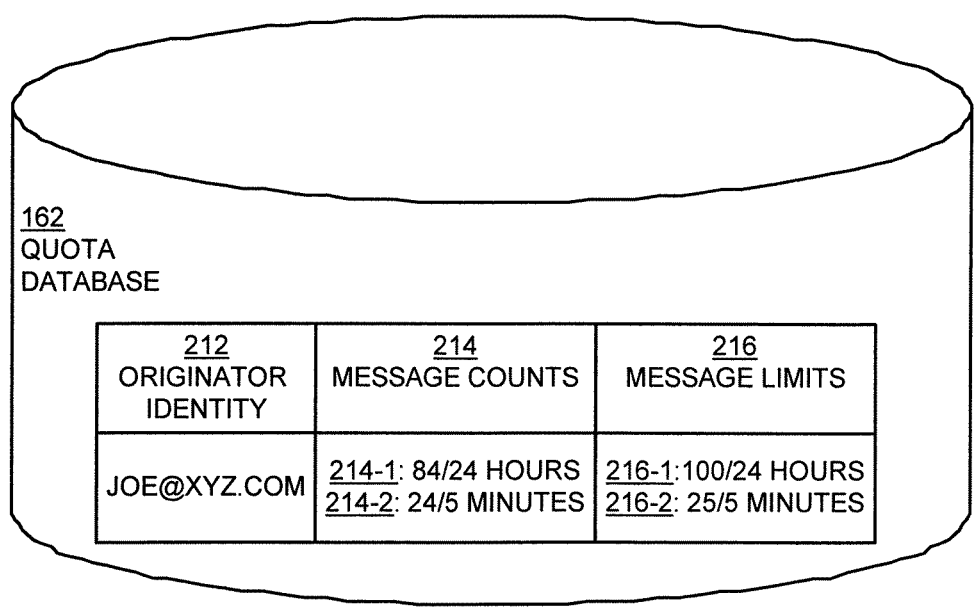
FIG. 6 is an example of the content of a quota database configured according to one embodiment of the invention.

FIG. 6 illustrates a specific example of the content of the quota database 162. Each entry (i.e., each row, only one shown in this example) in the quota database 162 indicates the current message counts 214 and message limits 216 for a particular originator identity 212. In the instant example, the originator identity 212 JOE@XYZ.COM has two associated message counts 214. Example message count 214-1 indicates that the user account having the originator identity 212 of JOE@XYZ.COM has previously transmitted eighty four (84) messages within the past twenty four (24) hours. Likewise, message count 214-2 indicates that this same user account has transmitted twenty four (24) messages in the past five (5) minutes of elapsed time, as measured by the quota server 160. Again, it is to be understood that for the purposes of this explanation, each recipient of a message counts as one message.

Referring now to the example message limits 216 for the originator identity 212 JOE@XYZ.COM in the quota database 162, the message limit 216-1 indicates that this user account is allowed to (i.e., is restricted to) transmit one hundred (100) outbound messages 110 within a given twenty four (24) hour time interval (e.g., as measured by the quota server 160 for the most recent 24 hours that have elapsed), while message limit 216-2 indicates that this user account is allowed to transmit twenty five (25) outbound messages 110 within any given five (5) minute time interval of elapsed time. The message limits 216 thus define the maximum quotas of outbound messages 110 that a particular account name associated with the originator identity 212 can transmit over a predetermined time interval as specified in the message limits 216. Generally, in this embodiment, message count 214-1 corresponds to message limit 216-1, while message count 214-2 corresponds to message limit 216-2. That is, as will be explained next, message count 214-1 is compared with message limit 216-1 to determine if the message limit 216-1 has been exceeded, while message count 214-2 is compared with message limit 216-2, and so forth.

It is to be understood that these message counts and message limits are provided as examples only and are meant to illustrate the concepts of the invention. It is also meant to be understood that while the present example illustrates two message counts 214 corresponding to two message limits 216 for a particular originator identity 212, there can be any number (zero or more) of message limits 214 and associated message counts 216 assigned to a particular originator identity 212.

Returning attention now to the processing in FIG. 7, the quota server 160 can perform step 503 to obtain the current message counts 214 for the particular originator identity 212 obtained in the processing of step 502 via a query to the quota database 162.

Next, in step 504, the quota server 160 obtains (e.g., via a query) the message limits 216 from the quota database 162 based on the originator identity 212 as obtained in step 502.

At this point, the message quota processing of the invention can make the determination of whether or not the outbound message 110 is allowed to be transmitted or not onto the computer network 130 to one or more of the recipients 192. Generally, this is done by comparing the current message counts 214 against a corresponding message limits 216 to determine if any of the message counts 214 exceed the message limits 216.

In particular, in step 505, the quota server 160 determines if any message counts 214 exceed their corresponding message limits 216. If the quota server 160 determines in step 505 that any message count 214 exceeds its corresponding message limit 216, then processing proceeds to step 412 where the quota server 160 prevents further transmission of the outbound message 110 to any recipients 192 by setting a message transmission result (not specifically shown) to a "NO-TRANSMIT" value and reports this condition to a log file (not specifically shown). While not shown in the figures, at this point (step 505), the quota server 160 can return a "QUOTA EXCEEDED" message back to the originator computer system 105 based on the originator identity 212. Such a "QUOTA EXCEEDED" message might, for example, indicate to the computer user controlling the originator computer system 105 what his or her message limits 216 are and how long that computer user will have to wait before being able to transmit an outbound message using the account name associated with the originator identity 212.

Alternatively, in step 505, if the quota server 160 determines that no message counts 214 currently exceed their corresponding message limits 216 for the originator identity 212, than processing proceeds to step 507.

In step 507, the quota server 160 updates the appropriate message counts 214 associated with the originator identity 212. In particular, in a preferred embodiment, each message count 214-1 and 214-2 are incremented by the number of different recipient identities listed in all of the "TO:" "CC:" and "BCC:" recipient fields 192 within the outbound message 110. In this manner, the current message counts 214 for the originator identity 212 of the account sending the outbound message 110 are updated to take into account recipients 192 of the outbound message 110. For example, if there are ten (10) different recipients designated in the recipient field 192 in the outbound message 110, then the quota server can increment each of the message counts 214-01 and 214-2 by ten (10).

It is understood that variations of this particular embodiment are possible while still remaining within the scope of the invention. For example, prior to performing step 507, the example message count 214-2 illustrated in FIG. 6 indicates that twenty four (24) messages have been sent in the past five (5) minutes by JOE@XYZ.COM (i.e., originator identity 212). However, the message limit 216-2 indicates that JOE@XYZ.COM is only allowed to send twenty five (25) messages 110 in a five minute interval. Accordingly, in one alternative embodiment, if the current outbound message 110 discussed in the above example contains ten (10) recipients, when the quota server 160 performs step 507 to update the message counts 214 for the originator identity 212 (JOE@XYZ.COM in this example), the message count 214-2 might be incremented to 34. This value would clearly be in excess of the message limit 216-2.

One embodiment of the invention provides a solution to this dilemma by having the quota server 160, in the update message count processing in step 507, compute the difference between the corresponding message limits 216 and the current message counts 214 (e.g., message limit 216-2 minus (−) message count 214-2=1, in this example). The result indicates how many copies of the outbound message 110 can be transmitted at the current time. In the instant example, only one copy of the message 110 can be sent at this time since the difference between the message limit 216-2 and message count 214-2 is one. The one copy of the outbound message 110 would be sent in this case to the first recipient listed in the recipient list 192 for that message 110. The quota server 160, in this embodiment, can then buffer the remaining copies of the outbound message 110 (one copy per each recipient designated in recipient field 192) for transmission at a later time, when the message counts 214 for their associated time intervals have been reduced, as explained below. Alternatively, the quota server 160 can discard any messages 110 for recipients 192 beyond the difference between message limit 216-2 and message count 214-2. In this manner, the system of the invention is able to limit the number of recipients 192 that can receive an outbound message 110 by one or more message limits 216.

In other words, in one embodiment of the invention, if a message count 214 has only X remaining messages that can be sent before that count exceeds its corresponding limit 216, then the invention in steps 505 and 507 will only allow X recipients to receive that message and will not allow the remaining recipients to get a copy of the message 110.

While not specifically shown as data within the quota database 162, the quota server 160 can determine and maintain an elapsed session time by comparing the current time with the session start time 214 obtained by the login extractor 154 within the login database 156. Such as elapsed session time value can be used to further update the message counts in step 507 by lowering or reducing the value of the message counts 214 for a particular originator identity 212 in the event that the elapsed time for a particular message count 214 has exceeded the time designated in a corresponding message limit 216 for that message count 214. The quota server 160 can perform such a reduction in message counts 214 over a sliding window or interval of time. In other words, since the quota server 160 is aware of the start time of the data communications session 166, and is further aware of each time (e.g., via a timestamp, not shown) at which each outbound message 110 is attempted to be transmitted onto the computer network 130 (e.g., the quota server 160 can maintain a timestamp record of the time at which each outbound message 110 is provided with a message transmission result having a "TRANSMIT" value, as will be explained shortly), the quota server 160 can use known processing techniques (e.g., simple measurements over time) to determine exactly how many outbound messages 110 have been transmitted in the most recent window of time designated by the time interval specified by each message limit 216-1 and 216-2. As this window of time progresses and no further message are sent, the message counts can be lowered.

In this manner, while receipt and transmission of outbound messages 110 to each recipient 192 results in the message counts 214-1 and 214-2 each being incremented by a value of one (1) for each recipient, concurrently with this process, as sufficient amounts of time elapse, the quota server 160 also can perform a process of decrementing the message counts 214 accordingly to credit the originator identity 212 with the ability to send more message 110 as periods of time elapse during which the originator identity 212 attempts to transmits no messages 110. The quota server 160 performs such incrementation and decrementation of the message counts 214 (i.e., updating of message counts) in step 507.

Upon completion of step 507, the quota server 160 performs step 508 to allow transmission of any copies of the outbound message 110 (one per designated recipient 192) that are within the message limits 214, as explained above, by setting a message transmission result to a "TRANSMIT" value for each recipient copy of such outbound messages 110.

After the quota server 160 performs either step 506 or step 508, the quota server 160 performs step 509 to process a copy of the outbound message 110 for each recipient 192 based on the message transmission result. In other words, step 509 is equivalent to step 252 in FIG. 2 which performs a selective transmit operation based on the message transmission result. For copies of the outbound message having a "TRANSMIT" value as their message transmission result, the quota server will forward such messages 110 on to a secondary message server 180. As indicated above, the quota server 160 will either reject or discard any outbound messages 110 that contain a "NO-TRANSMIT" value as their message transmission result.

In this manner, the system of the invention is able to control transmission of outbound messages 110 transmitted from originator computer systems 105 for receipt by recipients on the computer network 130. The system of the invention is extremely beneficial in situations where a computer user attempts various techniques for spoofing an e-mail server program into transmitting large amounts of unsolicited bulk outbound messages 110. For example, since the system of the invention tracks message quotas at the user account level (i.e., based upon unique originator identities 221 for a user account provided by a network service provider), it makes no difference how many times a computer user connects, transmits outbound messages, disconnects, and then reconnects again in an attempt to circumvent the system of the invention. Even though the originator computer system 105 obtains a unique and different network address (i.e., originator address 204) each time the computer user establishes a new connection 166, since the system of the invention maps these network originator addresses 204 back to the true originator identity 212 of the user account that the computer user uses to transmit outbound messages 110, the message counts 214 associated with that originator identity 212 are accurately maintained by the system of the invention. Accordingly, unless the computer user has access to an unlimited number of user accounts (a highly unlikely situation), once the user account assigned to a particular computer user reaches its message limit 216 for the predetermined time interval for that message limit 216, that computer user is prevented from further transmitting outbound messages 110.

Figure 8:
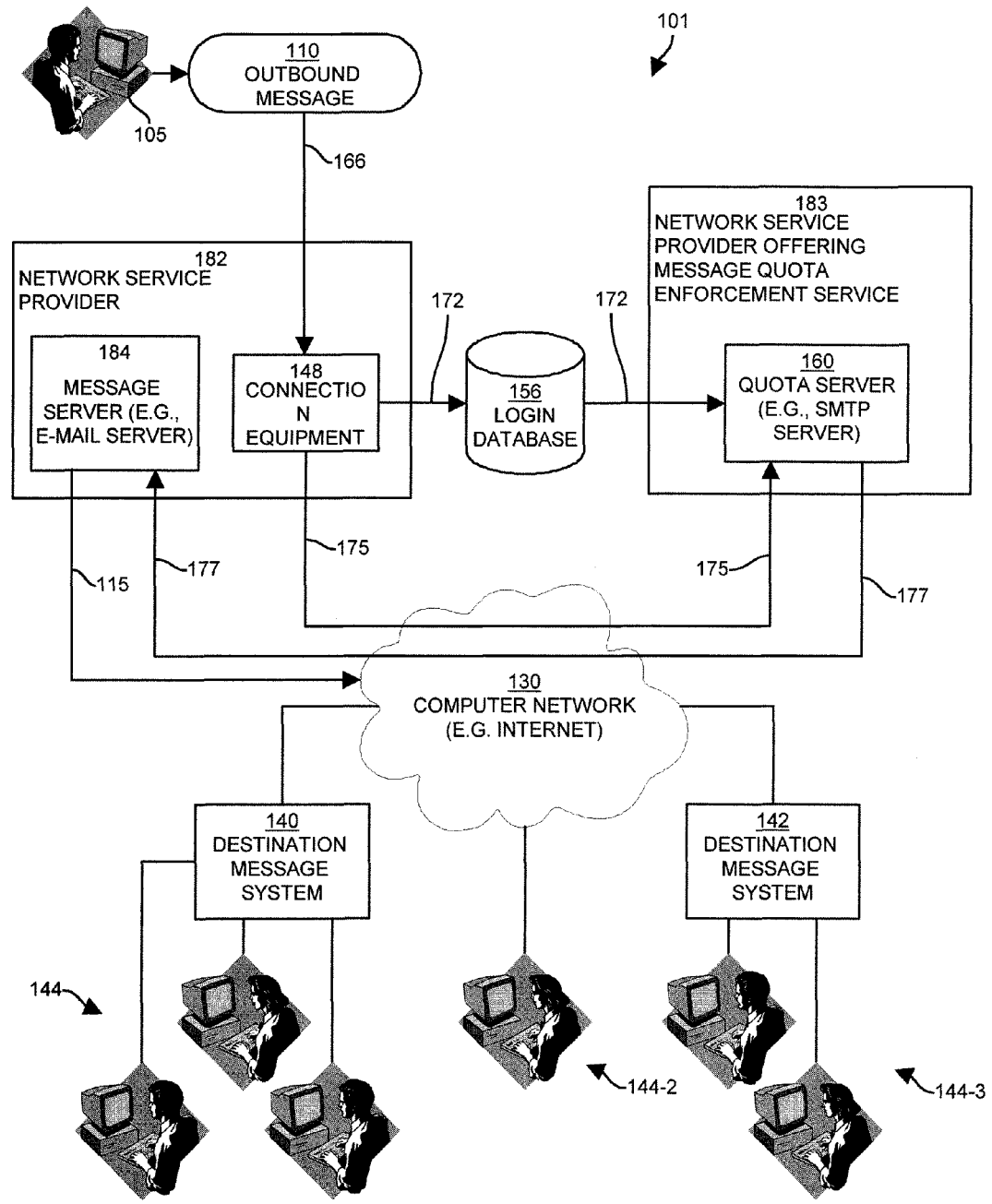
FIG. 8 illustrates an alternative computing system environment configured according to embodiments of the invention to perform message quota enforcement in a distributed manner for multiple network service providers which do not have such capability.

FIG. 8 illustrates an alternative example a computer system environment 101 configured according to embodiments of the invention. The computing system environment 101 includes two network service providers 182 and 183. The network service provider 182 includes the connection equipment 148 configured in accordance with the invention, as previously explained. The network service provider 182 also includes a message server 184. The network service provider 183 is equipped with a quota server 160 configured to operate according to embodiments of the invention, also as previously explained. Accordingly, the network service provider 183 offers a quota enforcement service that other network service providers can subscribe to, as does the network service provider 182 in this example.

In this example, suppose the network service provider 182 subscribes to a message quota enforcement service offered by the network service provider 183. As such, upon subscription to such a quota enforcement service, technicians (i.e., people such as systems administrators) associated with the network service provider 182 install the port redirector 158 (FIG. 3, if a port redirector does not currently exist) and login extractor 154 process within the connection equipment 148 at the facilities of the network service provider 182. Once the network service provider 182 has connection equipment 148 configured to operate as explained above, the connection equipment 148 performs the operations shown in FIG. 4.

In other words, the connection equipment 148 authorizes and authenticates connections 166 to the computer network 130 from originator computer systems 105 (e.g., via step 400). The login extractor 154 within the connection equipment 148 operates to capture, in the login database 156, a mapping between an originator identity 212 (FIG. 5) and a corresponding originator address 204 (FIG. 5) for the connection 166 (e.g., via step 401). Finally, the port redirector 158 detects (step 402) and redirects (steps 403 and 404) all outbound messages 110 (to which quota enforcement is to be applied) via data communications path 175 through the computer network 130 to the quota server 160 that operates within the domain or realm of the network service provider 149. In this manner, the network service provider 182 does not need to contain, maintain or operate the quota server 160.

Once the quota server 160 operating within the realm of the network service provider 183 receives, via data communications path 175, the redirected outbound message(s) 110, the quota server 160 within the network service provider 183 operates according to the processing shown in FIG. 7 to accept or deny the transmission of the outbound message(s) 110 for each recipient (e.g., recipients 192 in FIG. 3) designated in that message 110. For those outbound messages 110 which the quota server 160 determines should be allowed for transmission on the computer network 130 (i.e., for those messages 110 for recipients which do not exceed the quota or message limit 216 for a particular originator identity 212), the quota server 160 forwards those outbound messages 110, via data communications link 177, to the message server 184 within the network service provider 182. The message server 184 is the email server for network service provider 184 which then propagates each message to its intended recipient.

In this manner, the embodiment of the invention illustrated in FIG. 8 divides portions of the invention between different network service providers 182 and 183. Network service provider 183 can operate as a quota enforcement clearinghouse that provides a message quota enforcement subscription service to other network service providers that do not have such capabilities themselves. As explained above, for this to occur, the network service providers (e.g., 182) that desire to subscribe to such a service are properly configured to redirect all outbound messages 110 (e.g., via a Layer 4 switch or via another means such as a content router) which are to be subject to the message quota subscription enforcement service to the quota server 160 operating within the realm of the network service provider 183. Also, network service providers that subscribe to such a service are equipped with the login extractor 154 in order to determine the true originator identity 212 of computer user accounts which generate outbound messages 110 for propagation onto the computer network 130.

Those skilled in the art will appreciate that other variations are also possible. For example, the flow charts of processing steps as explained above described processing events in certain sequences. It is to be understood that modifications to the order of these processing steps is possible while still achieving the objectives of the system of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A computer-implemented method for controlling transmission of messages from an originator computer system through an originating mail server to a receiving mail server, a connection between the originator computer system and the originating mail server forming a sending side, the method comprising:
    detecting, on the sending side, an outbound message from the originator computer system, the outbound message associated with an originator identity;
    verifying, on the sending side, an authenticity of the originator identity;
    performing a quota enforcement operation based on a message count and a message limit associated with the originator identity to produce a message transmission result;
    transmitting the outbound message from the originating mail server to a receiving mail server on a computer network if the message transmission result contains a transmit value; and
    preventing transmission of the outbound message from the originating mail server to a receiving mail server on a computer network if the message transmission result contains a no-transmit value.

2. The method of claim 1, wherein the performing a quota enforcement operation comprises comparing the message count associated with the originator identity with the message limit assigned to the originator identity to determine an occurrence of a message limit condition, and if the message limit condition occurs, setting the message transmission result to a no-transmit value, and if the message limit condition does not occur, setting the message transmission result to a transmit value; and
    updating the message count associated with the originator identity.

3. The method of claim 2, wherein the updating the message count associated with the originator identity comprises:
    calculating a total number of recipients for the outbound message; and
    incrementing the message count associated with the originator identity by the total number of recipients for the outbound message.

4. The method of claim 1, wherein the message limit indicates an amount of outbound messages that may be transmitted from the originator computer system over a certain period of time for the originator identity.

5. The method of claim 1, wherein the originator identity is indicative of at least one of: a specific user account operating under control of a computer user, a specific message sending user, and a specific domain.

6. A computer system comprising:
    a hardware processor in communication with a network; and
    quota server logic executable by the processor to control transmission of messages from an originator computer system through an originating mail server to a receiving mail server, a connection between the originator computer system and the originating mail server forming a sending side on the network, the quota server logic configured to perform a method comprising:
        detecting, on the sending side, an outbound message from the originator computer system, the outbound message associated with an originator identity;
        verifying, on the sending side, an authenticity of the originator identity;

performing a quota enforcement operation based on a message count and a message limit associated with the originator identity to produce a message transmission result;

transmitting the outbound message from the originating mail server to a receiving mail server on a computer network if the message transmission result contains a transmit value; and preventing transmission of the outbound message from the originating mail server to a receiving mail server on a computer network if the message transmission result contains a no-transmit value.

7. The system of claim 6, wherein the performing a quota enforcement operation comprises comparing the message count associated with the originator identity with the message limit assigned to the originator identity to determine an occurrence of a message limit condition, and if the message limit condition occurs, setting the message transmission result to a no-transmit value, and if the message limit condition does not occur, setting the message transmission result to a transmit value; and updating the message count associated with the originator identity.

8. The system of claim 7, wherein the updating the message count associated with the originator identity comprises:

calculating a total number of recipients for the outbound message; and incrementing the message count associated with the originator identity by the total number of recipients for the outbound message.

9. The system of claim 6, wherein the message limit indicates an amount of outbound messages that may be transmitted from the originator computer system over a certain period of time for the originator identity.

10. The system of claim 6, wherein the originator identity is indicative of at least one of: a specific user account operating under control of a computer user, a specific message sending user, and a specific domain.

11. A computer program product for controlling transmission of outbound messages on a computer network from an originating mail server to a receiving mail server, a connection between the originator computer system and the originating mail server forming a sending side, the computer program product comprising:

a non-transitory tangible storage medium readable by a processing circuit and storing instructions for execution by the processing circuit for performing a method comprising:

detecting, on the sending side, an outbound message from the originator computer system, the outbound message associated with an originator identity;

verifying, on the sending side, an authenticity of the originator identity;

performing a quota enforcement operation based on a message count and a message limit associated with the originator identity to produce a message transmission result;

transmitting the outbound message from the originating mail server to a receiving mail server on a computer network if the message transmission result contains a transmit value; and preventing transmission of the outbound message from the originating mail server to a receiving mail server on a computer network if the message transmission result contains a no-transmit value.

12. The computer program product of claim 11, wherein the performing a quota enforcement operation comprises comparing the message count associated with the originator identity with the message limit assigned to the originator identity to determine an occurrence of a message limit condition, and if the message limit condition occurs, setting the message transmission result to a no-transmit value, and if the message limit condition does not occur, setting the message transmission result to a transmit value; and updating the message count associated with the originator identity.

13. The computer program product of claim 12, wherein the updating the message count associated with the originator identity comprises:

calculating a total number of recipients for the outbound message; and incrementing the message count associated with the originator identity by the total number of recipients for the outbound message.

14. The computer program product of claim 11, wherein the message limit indicates an amount of outbound messages that may be transmitted from the originator computer system over a certain period of time for the originator identity.

15. The computer program product of claim 11, wherein the originator identity is indicative of at least one of: a specific user account operating under control of a computer user, a specific message sending user, and a specific domain.

16. A computer-implemented method for controlling transmission of messages from an originator computer system through an originating mail server to a receiving mail server, a connection between the originator computer system and the originating mail server forming a sending side, the method comprising:

detecting, on the sending side, an outbound message from the originator computer system, the outbound message associated with an originator identity of an authorized user;

computing a difference between a message limit associated with the originator identity and a message count associated with the originator identity; and transmitting the outbound message from the originating mail server to the receiving mail server on a computer network to a number of recipients equal to or less than the computed difference between the message limit and the message count.

17. The method of claim 16, comprising:

buffering, for later transmission on the computer network, a number of copies of the outbound message equal to a difference between a total number of recipients for the outbound message and the number of recipients to which the outbound message is transmitted; and incrementing the message count associated with the originator identity by the total number of recipients for the outbound message.

18. The method of claim 16, wherein the originator identity is indicative of at least one of: a specific user account operating under control of a computer user, a specific message sending user, and a specific domain.

19. A computer program product for controlling transmission of outbound messages on a computer network from an originating mail server to a receiving mail server, a connection between the originator computer system and the originating mail server forming a sending side, the computer program product comprising:

a non-transitory tangible storage medium readable by a processing circuit and storing instructions for execution by the processing circuit for performing a method comprising:

detecting, on the sending side, an outbound message from the originator computer system, the outbound message associated with an originator identity of an authorized user;

computing a difference between a message limit associated with the originator identity and a message count associated with the originator identity; and transmitting the outbound message from the originating mail server to the receiving mail server on a computer network to a number of recipients equal to or less than the computed difference between the message limit and the message count.

20. The computer program product of claim 19, wherein the method further comprises:

buffering, for later transmission on the computer network, a number of copies of the outbound message equal to a difference between a total number of recipients for the outbound message and the number of recipients to which the outbound message is transmitted; and incrementing the message count associated with the originator identity by the total number of recipients for the outbound message.

21. The computer program product of claim 19, wherein the originator identity is indicative of at least one of: a specific user account operating under control of a computer user, a specific message sending user, and a specific domain.

22. The method of claim 1, wherein the steps of detecting, verifying and performing a quota enforcement operation are performed by a network service provider.

23. The method of claim 22, wherein the originating mail server is operated by the network service provider.

24. The computer-implemented method of claim 1, wherein the verifying, on the sending side, is associated with the outbound message.

25. The system of claim 6, wherein the verifying, on the sending side, is associated with the outbound message.

26. The computer program product of claim 11, wherein the verifying, on the sending side, is associated with the outbound message.

27. The computer-implemented method of claim 16, further comprising:

verifying, on the sending side, an authenticity of the originator identity of the authorized user associated with the outbound message.

28. The computer program product of claim 19, wherein the method further comprises:

verifying, on the sending side, an authenticity of the originator identity of the authorized user associated with the outbound message.

* * * * *